March 13, 1934.   G. P. BERRY   1,950,590
SLACK ADJUSTER FOR VALVES
Original Filed Sept. 26, 1931   3 Sheets-Sheet 1
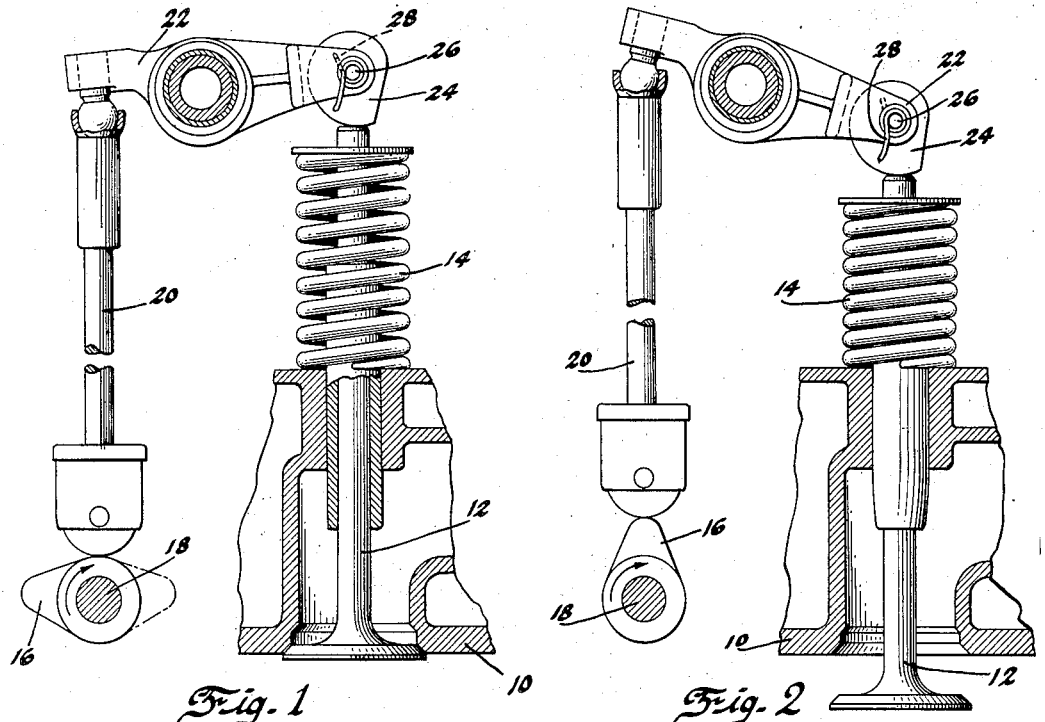
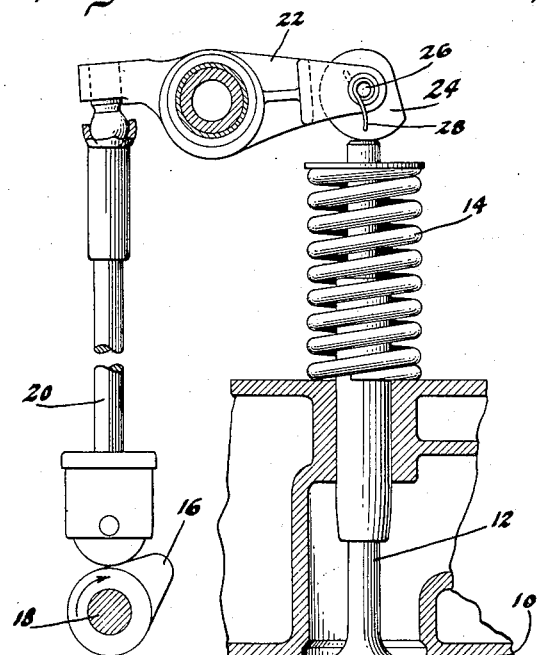
Inventor
George P. Berry
By Blackmore, Spencer & Flint
his Attorneys Inventor
George P. Berry
By Blackmore, Spencer & Flint
his Attorneys March 13, 1934.    G. P. BERRY    1,950,590

SLACK ADJUSTER FOR VALVES

Original Filed Sept. 26, 1931    3 Sheets-Sheet 3

Inventor
George P. Berry
Blackmore Spencer & Flint
By
his Attorneys

Patented Mar. 13, 1934

1,950,590

UNITED STATES PATENT OFFICE 1,950,590

SLACK ADJUSTER FOR VALVES

George P. Berry, Detroit, Mich., assignor to General Motors Research Corporation, Detroit, Mich., a corporation of Delaware Application September 26, 1931, Serial No. 565,277
Renewed November 16, 1933

4 Claims. (Cl. 123—90)

This invention has to do with slack take up mechanism for mechanical movements and particularly for those used to operate the valves of internal combustion engines. In such movements the amount of slack varies not only as a result of wear, but also as a consequence of contraction and expansion of parts during operation of the engine. With conventional valve gear this results in considerable variation in valve timing which make it necessary to use long ramps on the cams, so that there is a considerable period of slow valve lift and also considerable overlap in valve operation, impairing the performance of the engine. Conventional valve gear must be adjusted to provide enough slack to make sure that when the engine is extremely hot the expansion of parts will not result in holding the valves off of their seats. As a consequence when the engine is cold or moderately hot, the valve gear is noisy. It is usually the noise that causes the car owner to have frequent adjustments of his valve gear made. In performing this operation it is often the case that too little slack is left in the mechanism, with the result that the valves may be unable to seat and the result of this, in the case of the exhaust valve, may be that the valve is burned out by the hot escaping gases.

A successful slack take up mechanism must accommodate itself to changes in slack from whatever cause. A satisfactory slack take up mechanism should make a new take up adjustment during each cycle of operation: that is it should, during each cycle, first introduce slack into the system and then take it up. In this way there is theoretically never any slack in the system except for an instant prior to the take up action and the valves are never held off of their seats.

According to my invention I take up the slack by means of a cam pivoted to one of the operating parts and engaging another. A spring yieldingly tends to rotate the cam in a direction to take up slack. To create slack in the system I make the cam of such design as to be self-locking under operating pressure and I so design my valve gear that the cam is carried by a part whose path of movement intersects the path of movement of the part it engages. By this method of mounting, the cam during its movement wipes across the part it engages—in other words these parts not only move in the direction of the operating pressure but have a transverse movement with relation to each other. I have employed this transverse movement to effect shifting of the cam during the operating part of the cycle in a direction to introduce potential slack into the system. When the system is relieved of operating pressure and actual slack begins to develop, the spring rotates the cam in a direction to take it up. This operation is repeated during each cycle of valve operation.

The invention can best be understood by referring to the drawings in connection with the following description.

Figures 1 to 4 illustrate the application of my invention to one form of valve mechanism for internal combustion engines, the views showing the position of parts at three different stages of valve operation.

Figure 6 is a fragmentary top plan view of the cam end of the rocker of Figure 5.

Figure 8 is a view on line 8—8 of Figure 7, while

Figure 10 shows my invention applied to one form of V-type engine, while

Figure 13 is a fragmentary sectional view showing the application to overhead valve engines of a modified form of cam embodying my invention, while

Figure 5:
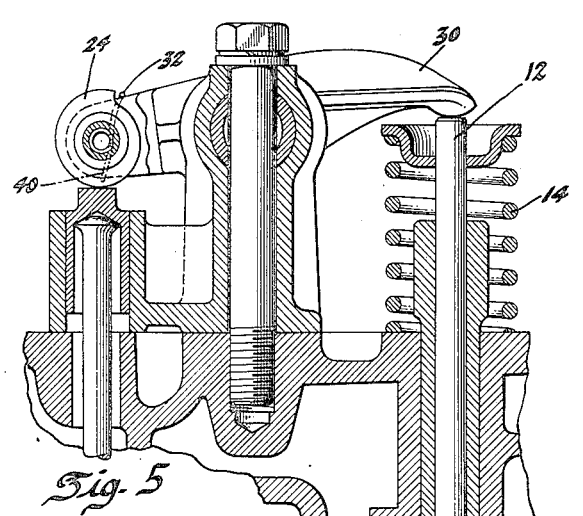
Figure 5 is a sectional view through a modified form of my invention.

Referring first to Figures 1 to 4, 10 indicates a portion of the cylinder head of an internal combustion engine of the overhead valve type. One of the valves is shown at 12, held on its seat by the conventional coil spring 14. The valve is opened by means of cam 16 on camshaft 18, lifting the push rod 20, which in turn, rocks the rocker arm 22 to depress the valve. My invention is shown embodied in a cam 24, pivoted at 26 in the end of the rocker arm, and yieldingly urged in clockwise direction by torsion spring 28.

The cam shown in these figures is a spiral cam, preferably of the type known as the logarithmic spiral, characterized by a constant angle of slope. However, if preferred, I may employ other well known spirals such as the spiral of Archimedes or the hyperbolic spiral. The logarithmic spiral is to be preferred as it gives more nearly constant operating characteristics. The slope of the cam is such that it is self locking:—in other words, it will not rotate on its axis as a result solely of the application of operating pressure. Expressed in terms of forces, the operating force acting at the end of the lever arm provided by the eccentricity of the cam, should not exceed the frictional resistance at the pivot of the cam. Where steel parts of usual finish are employed I have found that the slope of the cam should not exceed 6 to 8 degrees.

Figures 1 to 3 show my improved valve mechanism in the successive positions it assumes in operation.

In the position shown in Figure 1, the spring 14 is holding the valve on its seat, and is exerting no pressure on the cam rocker arm or connected parts. The push rod 20 is bearing on the base circle of the cam so that it, too, is free from operating pressure. During this period the spring 28 rotates the cam 24 to a position in which there is no slack in the system, and such is the position of parts as shown in Figure 1.

In Figure 2 the valve is shown in fully opened position, and the cam 24 is now engaging the end of the valve stem at a point lower down on its slope. This change has been effected by a rolling of the cam on the end of the valve stem by virtue of the lateral displacement of the axis of the cam as a result of the movement of the rocker arm from the substantially horizontal position shown in Figure 1 to the down-tilted position, shown in Figure 2. In producing this movement both the friction at the pivot of the cam and the force of spring 28 tending to rotate the cam 24 in the opposite direction had to be overcome. These forces have been overbalanced by the friction between the cam and the end of the valve stem and the operating pressure acting at the leverage provided by the eccentricity toward the left of the cam. The amount of shifting of the point of contact down the slope of the cam as a result of this rolling action is slight.

In Figure 3 the parts are shown in the position they assume when the valve has just reached its seat, and the tappet has almost reached a point on the base circle of the cam. In moving from the downwardly inclined position of Figure 2 to the substantially horizontal position of Figure 3, the rocker arm has given the axis of the cam a lateral movement toward the right, and this movement tended to roll the cam in a clockwise direction so that it would engage the valve stem at a higher point on its slope. Such rolling motion is now resisted not only by the friction at the pivot of the cam, but also by the operating pressure which, acting at the end of the lever arm provided by the eccentricity of the cam, tends to rotate the cam in counterclockwise direction. These combined forces exceed the friction at the point of contact of cam and valve stem so that sliding takes place at such point of contact and the cam moves with the rocker arm just as though it were an integral part of it. During the movement from the position shown in Figure 2 to the position shown in Figure 3, the cam slides over the end of the valve stem through an angle equal to the angle of movement of the rocker arm, and comes to rest with a lower point on its slope in contact with the valve stem than was the case in Figure 2. This change in position of the cam means that so much potential slack has been introduced in the system, and when the cam shaft turns beyond the position shown in Figure 3 and the push rod approaches the base circle of the cam spring 28 will rotate the cam in clockwise direction to the position shown in dotted lines in Fig. 4, taking up the slack that has been created. If during this cycle of operation the parts have expanded the spring will rotate the cam a lesser amount for there will be less slack to be taken up. If during the cycle of operation the parts have contracted the spring will rotate the cam a greater distance for there will be more slack to be taken up. This action will be repeated during each cycle of valve operation.

In the design shown in Figures 1 to 4 it will be noted that the rocker arm pivot is not in the middle of the rocker arm but the longer lever arm is that extending toward the valve stem. Consequently the cam located at the valve stem end of the rocker arm will have a lesser range of take-up than the same cam located at the push rod end of the rocker arm. I have found that with the cam over the valve stem the possible range of adjustment of the takeup mechanism corresponds to approximately ⅛" movement of the valve stem. With this type of construction the amount of lash introduced by backing off of the cam may be held as low as .002" so that the ⅛" range of adjustment will enable the slack takeup mechanism to function automatically for the period of service during which an engine will usually operate without requiring overhauling.

Figures 6, 8:
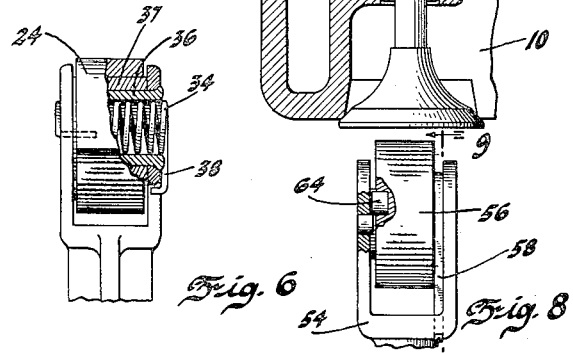

In Figures 5 and 6 I have illustrated an optional arrangement in which the cam 24 is located on the push rod end of the rocker arm 30. The torsion spring 32 functions as before to tend to rotate the cam in a direction to take-up slack. This spring is in the form of a coil 34 housed within the hollow pivot 36, and having one end 38 held against movement as by hooking it over the forked end of the rocker arm, and having its other end 40 secured in an aperture in the cam. To increase the friction at the pivot of the cam the diameter of the bearing may be increased by journaling the cam on a bushing 37 secured to the hollow pivot 36.

The principle of operation of this design is the same as that of the first described form. By mounting the cam at this end of the rocker arm the lash introduced by the backing off of the cam will be approximately .004" where the cam is of such slope as to permit a total range of adjustment corresponding to a valve movement of ¼". Where the cam is of such slope as to have a range of adjustment corresponding to valve movement of ⅜", the lash introduced by backing off of the cam will be approximately .006". The greater range of adjustment arising from the location of the cam at the end of the shorter lever arm insures automatic adjustment throughout the entire life of the engine. Likewise, at this end of the rocker arm the parts may be thoroughly lubricated without bad results. In such constructions lubrication is usually accomplished by using the hollow pivot of the rocker arm as an oil reservoir and supplying it with oil from the conventional pressure feed lubricating system. From this reservoir oil may be diverted to the ends of the rocker arm, but it is undesirable to project any considerable amount of oil on the valve stem, for the oil gradually seeps down between the valve stem and its guide producing a carbon deposit on the valve stem which tends to make it stick. There is no such objection to supplying copious quantities of oil to a cam on the push rod end of the rocker.

The torsion spring employed in this form of the invention has the advantage that it is very simple, and, in addition, acts as a stop limiting the amount of rotation of the cam in case a valve sticks open.

Figure 7:
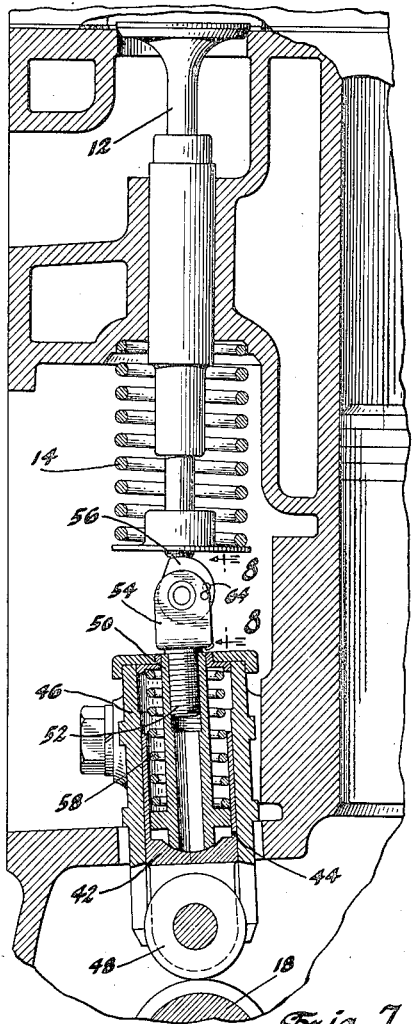
Figure 7 is a vertical section showing my invention applied to L head engines.
Figure 9:
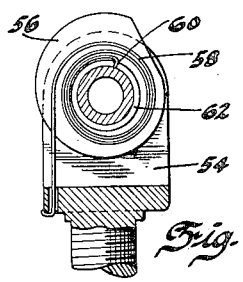
Figure 9 is a section on line 9—9 of Figure 8.

In Figures 7, 8 and 9, I have shown my invention applied to an L-head engine. In this case the valve 12 is held on its seat as usual by the coil spring 14. It is opened by a cam on camshaft 18 raising the tappet 42. This tappet may be of any preferred construction. It is indicated as consisting of a cylinder 44 guided for sliding movement in guide 46. The cylinder carries at its bottom a roller 48 for engagement with the cam. In the top of the tappet there is slidably mounted a sleeve 50 into which is threaded a stud 52 carrying yoke 54 in which there is pivotally mounted a cam 56. The sleeve 50 is urged downwardly by a spring 58 engaging the underside of the top of the tappet and a collar on the bottom of the sleeve. The details of mounting of the sleeve carrying the cam rocker are not important, but were merely convenient in adapting the invention to an existing engine.

The cam 56 and its mounting are shown in detail in Figures 8 and 9. It is of the same design as the cams 24 previously described except that it is urged in a direction to takeup slack by a torsion spring 58 of the spiral clock type having one end 60 hooked in sleeve 62 either integral with or fixed to the cam 56, and having its other end 62 secured in the fork 54. The only advantage of the spiral clock spring is that it allows a greater range of takeup with a definite size cam. With this construction a pin stop such as shown at 64 should be provided on the cam to prevent complete unwinding of the spring in case a valve sticks open.

An essential to the construction of Figure 7 is the angling of the tappet with respect to the valve stem. In other words, as in the form shown in Figures 1 to 4, the part carrying the cam and the part the cam engages must have intersecting paths of movement so that there will be a wiping action between the cam and the part with which it contacts. This wiping action is essential to accomplish the backing off of the cam.

Figure 10:
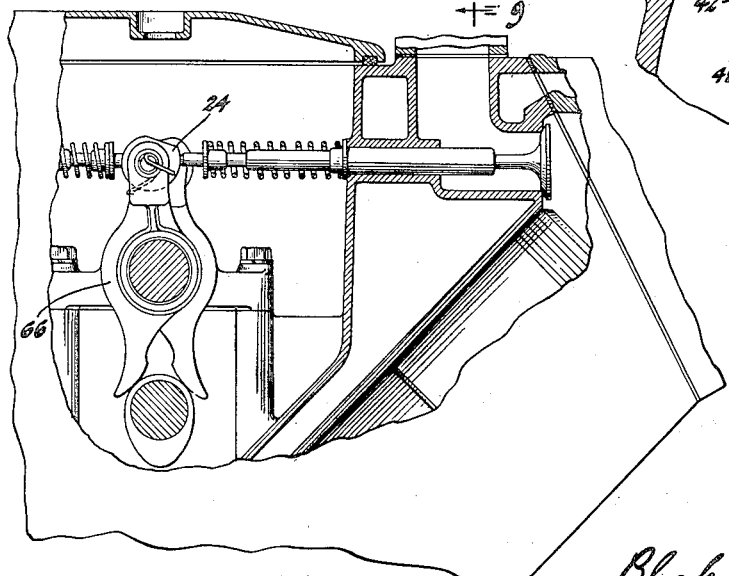

In V-type and L-head engines the intersecting paths of movement of the cam and the part it engages may be provided by employment of rockers. I have indicated such constructions in Figures 10 and 12. In Figure 10 the cams 24 are mounted in the upper ends of rocker arms 66, the lower ends of which are operated by the cams on the camshaft. The cams 24 engage the bottoms of the valve stems as shown in the figure or, if preferred, tappets may be provided between the cams and the valve stems.

Figure 11:
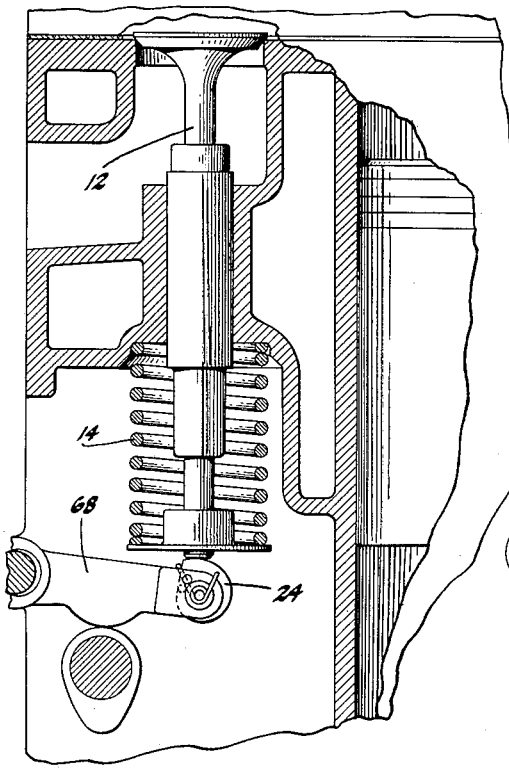
Figures 11 and 12 show further applications of my slack take up mechanism.
Figure 12:
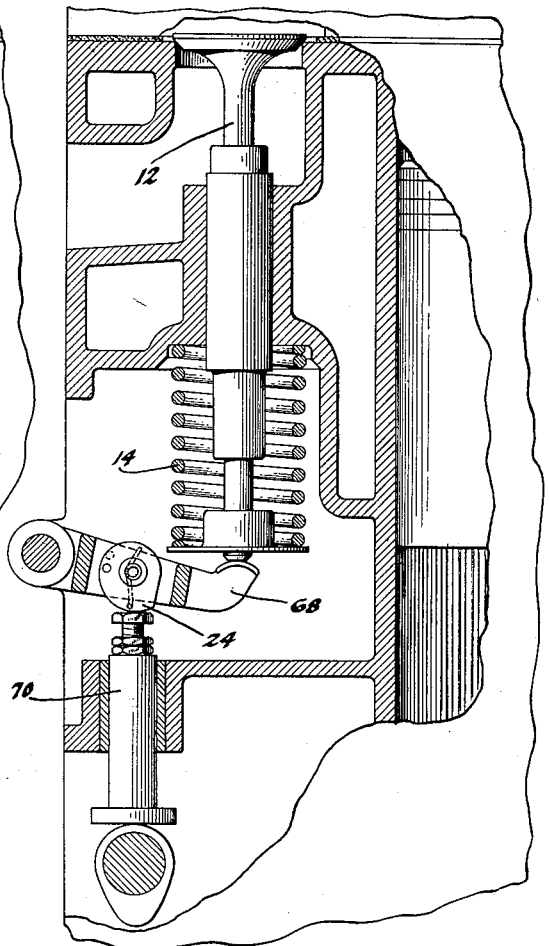

In Figures 11 and 12 I have shown substantially the same arrangement applied to L-head engines. In these figures the cam on the camshaft operates rockers 68 which, in turn actuate the valves 12 in a well known manner. In Figure 11 the cam 24 is mounted at the end of the rocker arm and directly engages the end of the valve stem. In Figure 12 the cam engages the end of a tappet 70 which is actuated by the camshaft. The form shown in Figure 12 obviously has the disadvantage that a given amount of backing off of the cam will introduce a greater amount of slack into the system owing to the shorter lever arm just as in the case of the form shown in Figure 5.

Figure 13:
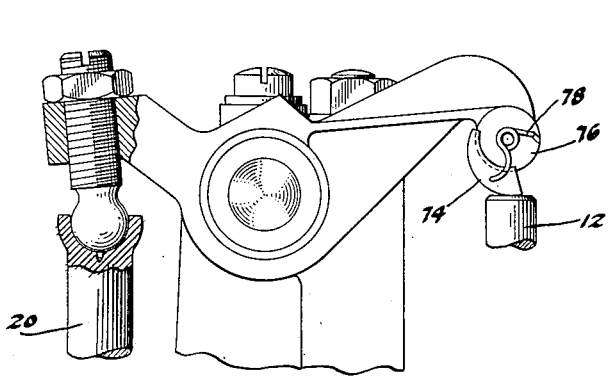
Figure 14:
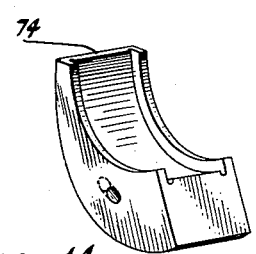
Figure 14 is a perspective view of the same cam.

In Figures 13 and 14, I have shown a modification in which a segment of a cam is employed. This segment takes the form of a shoe 74, shown in detail in Figure 14, mounted on a bearing 76 provided at the end of the rocker arm. A torsion spring 78 urges the cam in a direction to take up slack. In this construction the spiral spring 78 likewise serves to hold the shoe 74 in engagement with the bearing 76. The disadvantage of this construction lies in its limited range of adjustment.

I have successfully employed cams having slopes of from 3 to 5 degrees. However, I believe that for practical purposes cams having slopes of from 2 to 6 degrees will be found practical. However, even this range is not absolute for it will be found to vary with the coefficient of friction at the points of contact of the cam and the part it engages and at the pivot of the cam. The important requirements for successful operation are that the cam must be of such angle as to be self-locking, in other words, the turning moment resulting from the operating force acting at the end of the lever arm provided by the eccentricity of the cam must be sufficient to overcome the friction at the pivot of the cam and rotate the cam when aided by the drag of the push rod or valve stem across the periphery of the cam, but must be insufficient to do this alone. Likewise, the drag of the push rod or valve stem across the periphery of the cam must be insufficient to overcome the friction at the pivot of the cam and produce rotation of the cam when resisted by the turning moment constituted by the operating pressure acting at the end of the lever arm afforded by the eccentricity of the cam. Expressed a little differently the design must be such that neither the frictional drag of the push rod or valve stem across the periphery of the cam, nor the turning moment resulting from the operating pressures, are alone sufficient to cause the cam to rotate about its pivot. However, when the drag is in the proper direction, e. g., in the same direction as the force of the turning moment, the cam will rotate about its pivot.

I claim:

1. In a mechanical movement, the combination of a plurality of members arranged for movement along intersecting paths, means for intermittently applying operating force to said movement to cause one member to actuate the other, means for taking up slack between said members comprising a self-locking cam mounted for rotation with respect to one of said members and having a cam surface engaging the other member, said cam having a small angle of slope so that it will not rotate about its axis under normal operating pressures but will rotate about its axis under the combined action of the operating pressure and the drag of said last named member across the cam surface as a consequence of movement of the members along intersecting paths, whereby slack is introduced into the system during the operation portions of the cycle of movement, and means tending to rotate said cam in a direction to take up slack in the system, said means being effective only during the non-operating portions of the cycle of movement.

2. In a mechanical movement, the combination of a plurality of members arranged for movement along intersecting paths, means for intermittently applying operating force to said movement to cause one member to actuate the other, means for taking up slack between said members comprising a self-locking spiral cam pivoted to one of the members about an axis transverse to its path of movement and having its cam surface engaging the other member, said cam having a small angle of slope so that it will not rotate about its axis under normal operating pressures but will rotate about its axis under the combined action of the operating pressure and the drag of said last named member across the cam surface as a consequence of movement of the members along intersecting paths, whereby slack is introduced into the system during the operating portions of the cycle of movement, and means tending to rotate said cam in a direction to take up slack in the system, said means being effective only during the non-operating portions of the cycle of movement.

3. In a mechanical movement, the combination of a reciprocating member and a lever member having intersecting paths of movement, means for intermittently applying operating force to said movement to cause one member to actuate the other, means for taking up slack between said members comprising a self-locking cam journalled in one of said members and having a cam surface engaging the other member, said cam having a small angle of slope so that it will not rotate about its axis under normal operating pressures but will rotate about its axis under the combined action of the operating pressure and the drag of said last named member across the cam surface as a consequence of movement of the members along intersecting paths, whereby slack is introduced into the system during the operating portions of the cycle of movement, and means tending to rotate said cam in a direction to take up slack in the system, said means being effective only during the non-operating portions of the cycle of movement.

4. In valve operating mechanism for engines and the like, the combination of a camshaft, a cam on the shaft, means intermittently actuated by the cam for operating a valve comprising a plurality of members arranged for movement along intersecting paths, means for taking up slack between said members comprising a self-locking cam mounted for rotation with respect to one of said members and having a cam surface engaging the other member, said cam having a small angle of slope so that it will not rotate about its axis under normal operating pressures but will rotate about its axis under the combined action of the operating pressure and the drag of said last named member across the cam surface as a consequence of movement of the members along intersecting paths, whereby slack is introduced into the system during the operating portions of the cycle of movement, and means tending to rotate said cam in a direction to take up slack in the system, said means being effective only during the non-operating portions of the cycle of movement.

GEORGE P. BERRY.